A. H. PLUMMER AND C. P. MULLEN.
OIL DEFLECTOR FOR ENGINE CYLINDERS.
APPLICATION FILED APR. 2, 1919.
1,328,544.
Patented Jan. 20, 1920.
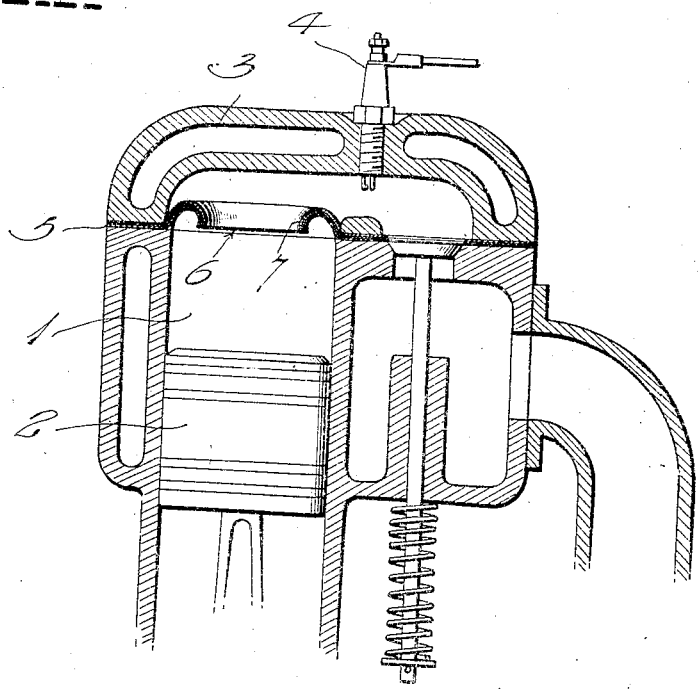
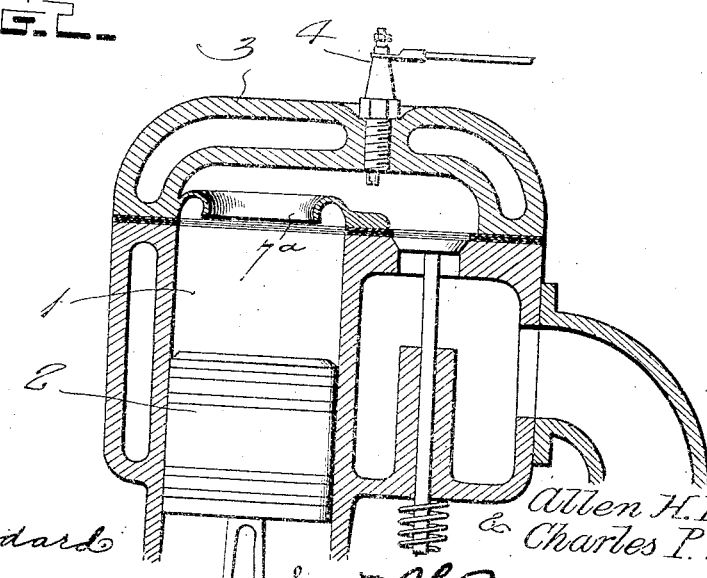
Witness
H. Woodard
Inventors
Allen H. Plummer
& Charles P. Mullen,
by H. R. Wilson & Co.
Attorneys

UNITED STATES PATENT OFFICE.

ALLEN H. PLUMMER AND CHARLES P. MULLEN, OF CONSHOHOCKEN, PENNSYLVANIA.

OIL-DEFLECTOR FOR ENGINE-CYLINDERS.

1,328,544.  Specification of Letters Patent.  Patented Jan. 20, 1920.

Application filed April 2, 1919. Serial No. 286,896.

*To all whom it may concern:*

Be it known that we, ALLEN H. PLUMMER and CHARLES P. MULLEN, citizens of the United States, residing at Conshohocken, in the county of Montgomery and State of Pennsylvania, have invented certain new and useful Improvements in Oil-Deflectors for Engine-Cylinders; and we do declare the following to be a full, clear, and exact description of the invention, such as will enable others skilled in the art to which it appertains to make and use the same.

Our invention relates to improvements in internal combustion engines and has for its object to provide an extremely simple and inexpensive, yet a highly efficient means to prevent oil thrown off by the piston, from reaching the spark plug and fouling the same. In carrying out this end, we provide an internal flange for the cylinder and such flange may either be formed as an integral part of the cylinder, or carried by the usual gasket employed between the cylinder and the cylinder head, said flange being arched in transverse section to effectively deflect the oil.

With the foregoing in view, the invention resides in the novel construction and arrangement of parts hereinafter described and claimed, reference being made to the accompanying drawing which forms a part of this application.

Figure 1 is a vertical transverse section of a common form of internal combustion engine, showing the oil deflecting flange formed on the cylinder head gasket.

Fig. 2 is a view similar to Fig. 1, but illustrating the flange formed as an integral part of the cylinder head.

In the drawing above briefly described, the numeral 1 designates the cylinder of an automobile or other engine, 2 has reference to the piston operating in said cylinder, 3 refers to the usual removable cylinder head, and 4 indicates the spark plug. A gasket 5 is provided between the cylinder head and the remainder of the cylinder and is provided with an opening 6 for communication with the cylinder bore. The wall of this opening is usually flush with the cylinder wall and does not in any manner serve to check the oil thrown upwardly by the piston 2, and consequently such oil strikes the spark plug and often prevents proper firing thereof.

In the present invention, however, the opening 6 is smaller than usual and the portion of the gasket around said opening is stamped to form a flange 7 of arch shape in transverse section. This flange extends inwardly from the cylinder wall and due to this shape, it will check any oil thrown upwardly by the piston and deflect such oil away from the spark plug, so that fouling of the latter is prevented.

In the form of the invention shown in Fig. 2, the flange 7ª is cast as an integral part of the cylinder head at the juncture of said head with the cylinder 1 and is of the same shape as the flange 7 above described. This construction may be followed if desired, but it is preferable to provide the flange on the gasket instead of on the cylinder head, in order that changes in construction of the usual motor will not be necessary.

From the foregoing, taken in connection with the accompanying drawing, it will be seen that although our invention is of an extremely simple and inexpensive nature, it will be highly efficient and desirable for the purpose intended, and since probably the best results are obtainable from the details disclosed, they may well be followed. We wish it understood, however, that within the scope of the invention as claimed, numerous minor changes may well be made. For instance, although the flanges 7 and 7ª are shown of such shape as to direct the oil back against the cylinder wall as the piston descends, they might well be of any other adequate formation.

We claim:—

1. The combination with an internal combustion engine cylinder, a piston in said cylinder, and a spark plug in the cylinder head; of an inwardly projecting flange extending continuously around the cylinder at its juncture with the cylinder head, said flange being arched in transverse section to deflect all oil thrown off by the piston away from said spark plug.

2. The combination with an internal combustion engine cylinder, a piston in said cylinder, a removable head for said cylinder, and a spark plug in said cylinder head; of a gasket between said cylinder head and cylinder having a relatively small opening for communication with the cylinder bore, the portion of the gasket around said opening forming a flange to deflect all oil thrown off by the piston away from said spark plug.

3. The combination with an internal combustion engine cylinder, a piston in said cylinder, a removable head for said cylinder, and a spark plug in said cylinder head; of a gasket between said cylinder head and cylinder having a relatively small opening for communication with the cylinder bore, the portion of the gasket around said opening being stamped to form a flange of arch shape in transverse section, said flange extending into the cylinder and serving to deflect all oil thrown off by the piston away from the spark plug.

4. A cylinder head gasket for internal combustion engines having an opening for communication with the cylinder bore, said opening being of less diameter than said bore, the portion of the gasket around said opening forming an oil deflector to prevent the piston from throwing oil against the spark plug.

5. A cylinder head gasket for internal combustion engines having an opening for communication with the cylinder bore, said opening being of less diameter than said bore, the portion of the gasket around said opening being stamped to form an arched oil deflecting flange to prevent the piston from throwing oil against the spark plug.

In testimony whereof we have hereunto set our hands.

ALLEN H. PLUMMER.
CHARLES P. MULLEN.